(12) United States Patent
Krassowski et al.

(10) Patent No.: US 6,395,199 B1
(45) Date of Patent: May 28, 2002

(54) PROCESS FOR PROVIDING INCREASED CONDUCTIVITY TO A MATERIAL

(75) Inventors: Daniel Witold Krassowski, Columbia Station; Jing-Wen Tzeng, Brunswick, both of OH (US); Brian McNeil Ford, Grayslake, IL (US)

(73) Assignee: Graftech Inc., Wilmington, DE (US)

( * ) Notice: Subject to any disclaimer, the term of this patent is extended or adjusted under 35 U.S.C. 154(b) by 0 days.

(21) Appl. No.: 09/589,316

(22) Filed: Jun. 7, 2000

(51) Int. Cl.$^7$ .............................. H01B 1/24; B05D 5/12
(52) U.S. Cl. .................... 252/511; 427/97; 427/122
(58) Field of Search ................ 252/511; 427/97, 427/122

(56) References Cited

U.S. PATENT DOCUMENTS

| | | | |
|---|---|---|---|
| 3,404,061 A | 10/1968 | Shane et al. | 161/125 |
| 3,573,122 A | * 3/1971 | Olstowski et al. | 13/4 |
| 4,265,952 A | * 5/1981 | Caines | 428/36 |
| 4,619,741 A | 10/1986 | Minten et al. | 204/15 |
| 4,704,231 A | * 11/1987 | Chung | 252/511 |
| 4,895,713 A | 1/1990 | Greinke et al. | 423/448 |
| 4,915,925 A | * 4/1990 | Chung | 423/447.1 |
| 4,971,726 A | * 11/1990 | Maeno et al. | 252/511 |
| 5,167,868 A | * 12/1992 | Willey et al. | 252/502 |
| 5,330,680 A | 7/1994 | Sakawaki et al. | 252/309 |
| 5,389,270 A | 2/1995 | Thorn et al. | 252/22 |
| 5,776,372 A | * 7/1998 | Saito et al. | 252/511 |
| 6,001,919 A | 12/1999 | Yen et al. | 524/496 |
| 6,019,833 A | 2/2000 | Hartman et al. | 106/476 |
| 6,084,008 A | * 7/2000 | Liu | 523/179 |

FOREIGN PATENT DOCUMENTS

| | | |
|---|---|---|
| GB | 2144138 | 2/1985 |
| GB | 2218992 | 11/1989 |
| JP | 1095168 | 4/1989 |

OTHER PUBLICATIONS

WPI Abstract AN 1993–129165 [16] & JP 5065366 A (Yazaki), note Abstract.
WPI Abstract AN 1992–289007 [35] & JP 4198271 A (Mitsi Kozan), note Abstract.
WPI Abstract AN 1988–326083 [25] & JP 63239707 A (Osaka Soda et al), note Abstract.

\* cited by examiner

*Primary Examiner*—Mark Kopec
(74) *Attorney, Agent, or Firm*—James R. Cartiglia

(57) ABSTRACT

The invention presented relates to a process for providing increased electrical and/or thermal conductivity to a material, and to the materials prepared by the process. More particularly, the invention relates to a process involving applying particles of expanded graphite to a substrate or material in order to increase its conductivity. The particles of expanded graphite can be applied to the substrate or material through coating of the substrate with a composition comprising the expanded graphite particles, or by incorporating particles of expanded graphite into the substrate or material itself.

32 Claims, No Drawings

PROCESS FOR PROVIDING INCREASED CONDUCTIVITY TO A MATERIAL

TECHNICAL FIELD

The present invention relates to a process for providing increased electrical and/or thermal conductivity to a material, and to the materials prepared by the process. More particularly, the invention relates to a process involving applying particles of expanded graphite to a substrate or material in order to increase the conductivity of the substrate or material. The particles of expanded graphite can be applied to the substrate or material through coating of the substrate with a composition comprising the expanded graphite particles, or by incorporating particles of expanded graphite into the substrate or material itself.

BACKGROUND OF THE INVENTION

There has been a longstanding need in industry to provide electrical conductivity to non- or insufficiently conductive materials. For instance, in the automotive industry, electrostatic painting is the most highly preferred method of painting component parts. Electrostatic painting offers several times the transfer efficiency of spray painting, providing improved quality and creating significant savings by allowing paint usage to be cut by up to 75%. This has the additional benefit of greatly reducing emissions of volatile organic compounds and other hazardous pollutants, as compared with spray painting. However, electrostatic painting requires a conductive surface for effectiveness. Conventionally, when the part to be painted is a plastic or other non-metallic material, the part first has to have a primer coating of a conductive paint applied, making the electrostatic painting process more involved and therefore less desirable than otherwise.

For instance, in U.S. Pat. No. 6,019,833, Hartman, Rei, Castagnone and Hamay describe the use of a primer coating for facilitating the electrostatic painting of a non-conductive article, the primer coating containing carbon fibrils. In an attempt to address this problem, U.S. Pat. No. 6,001,919 to Yen, Ingham and Bono, describes a molding composition having a conductive filler, specifically carbon black, to form an article having sufficient conductivity to support electrostatic painting;

Likewise, certain components, such as automotive fuel system components, must be treated to dissipate static electricity, to avoid accidental ignitions. For instance, certain fuel system components are being proposed, such as fuel filler components, which are made out of plastics like nylons. Such plastic components require improved static discharge properties.

Another, unrelated area in which improved electrical conductivity may be desired is in the manufacture of printed circuit boards. Conventionally, printed circuit boards are solid circuits formed from a conductive material positioned on opposite sides of an insulating material, or in layers with insulating material interposed between the layers of conductive material. In order to make electrical connections between the circuits on the circuit board, a hole is first drilled through the board, i.e., through the conducting sheets and the interposed insulator material. These holes are known in the art as "through holes." A conductive pathway must then be formed to connect the respective circuits. Most commonly, that conductive pathway is formed by the electrolytic deposition of copper on the surfaces of the through holes. However, the presence of insulating material makes the electrolytic deposition of copper difficult and inconsistent. As a result, sufficient conductivity must be established on the through hole surfaces to permit the electrolytic copper deposition.

Several methods have been suggested for creating sufficient conductivity to permit the consistent electrolytic deposition of copper on through hole surfaces. One such method is through the use of so-called "electroless" copper, that is, copper that is chemically deposited on the through hole surfaces at a thickness sufficient to permit electrolytic deposition (but not thick enough to eliminate the need for electrolytic deposition). Although electroless deposition has proven effective, it has several commercial disadvantages. For instance, the electroless deposition process requires multiple steps prior to electroplating; involves a relatively long process time; uses multiple treatment baths; involves a complex chemistry that may require constant monitoring and individual ingredients which may require separate replenishment; uses various chemical agents that are considered carcinogens and/or are otherwise hazardous or include heavy metals, thus posing safety concerns and requiring extensive waste treatment; and utilize a multiplicity of rinse baths and thus may require large amounts of water.

In an attempt to avoid the disadvantages of the electroless deposition process, Minten and Pismannaya, in U.S. Pat. No. 4,619,741, describe coating the surfaces or walls of printed circuit board through holes with particles of carbon black, to provide sufficient conductivity to support electrolytic copper deposition. In a similar vein, Thorn, Polakovic and Mosolf, in U.S. Pat. No. 5,389,270, disclose coating the walls of printed circuit board through holes with particles of graphite having a mean particle size of from 0.05 to 50 microns. Although Thorn et al. suggest that particles of natural graphite can be used, they indicate that synthetic graphite is preferred.

Prior methods disclosed for providing conductivity to insufficiently conductive articles suffers from significant drawbacks. For instance, carbon fibers, carbon fibrils, nanotubes, nickel coated carbon fibers, steel fibers, carbon blacks, etc. have been proposed as conductive fillers, but the loading levels required in many prior art methods to provide the required degree of conductivity can be prohibitively high; likewise, consistency is often a problem, as is weight and density. Similarly, the cost of some of the prior art methods, such as carbon fibrils or nanotubes, can also be prohibitive.

Other relatively non-conductive materials, including greases and oils, can act as heat and electrical insulators, and thereby do not sufficiently dissipate heat and static electricity from, e.g., gear boxes and other moving metallic parts where friction can generate heat and static electricity. Failure to sufficiently dissipate the heat and static electricity can cause undue or early corrosion.

There are also many applications in which conductive adhesives may be desirable. For instance, adhesives are often used to bond materials such as heat sinks or thermal interfaces to a heat source. With insufficient conductivity, an adhesive can interfere with the desired thermal transfer, degrading the usefulness of the heat sink or thermal interface. In addition, a conductive adhesive can also function to facilitate grounding of an electrical device in which it is used.

What is desired, therefore, is a process for increasing the conductivity of an insufficiently conductive material, article or surface, which does not adversely affect the other desirable properties of the material, article or surface. Such a process is cost-effective, and provides sufficient conductivity without undesirably high loading levels or weight increase.

SUMMARY OF THE INVENTION

It is an object of the present invention to provide a process for increasing the conductivity of an insufficiently conductive material, article or surface.

It is another object of the invention to provide a process that increases the conductivity of a material, article or surface while preserving the desirable characteristics of the material, article or surface.

It is yet another object of the invention to provide an article having sufficient conductivity to permit the electrostatic painting of the article.

It is still another object of the present invention to provide a printed circuit board having through hole walls sufficiently conductive to permit the electrolytic deposition of copper on the walls.

It is a further object of the present invention to provide an oil or grease sufficiently conductive to at least partially dissipate the heat and/or static electricity generated by moving parts.

It is still another object of the present invention to provide an adhesive which is sufficiently conductive to minimize the reduction of thermal or electrical conduction between two object bonded by use of the adhesive.

These objects and others that will become apparent to the artisan upon review of the following description can be accomplished by a process for providing increased electrical and/or thermal conductivity to a material or a substrate, especially a plastic substrate. Suitable substrates include an automobile component part or a printed circuit board. The process involves coating at least some of the surfaces of the substrate with a composition that includes particles of expanded graphite. Preferably, the particles of expanded graphite are formed into a powder prior to coating the composition on the substrate, and the composition further includes a carrier for the powdered particles of expanded graphite, the carrier being a material capable of forming an adherent coating on the targeted surfaces of the substrate.

In another embodiment of the invention, a process for providing increased electrical conductivity to a substrate is provided, where the process involves incorporating particles of expanded graphite into the substrate. As noted, the process preferably utilizes the particles of expanded graphite formed into a powder prior to incorporating the expanded graphite into the substrate.

In alternative embodiments of the invention, the particles of expanded graphite are incorporated into a grease or oil such as a polyolefin or other hydrocarbon grease or oil; an adhesive such as a acrylic, starch, polyethylene or epoxy adhesive composition; or a rubber composition, to provide increased thermal and/or electrical conductivity to the material into which the particles of expanded graphite are incorporated.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size, the crystallites being highly aligned or oriented with respect to each other and having well ordered carbon layers. In other words, highly ordered graphites have a high degree of preferred crystallite orientation. Graphites possess anisotropic structures and thus exhibit or possess many properties such as electrical conductivity that are highly directional. Briefly, graphites may be characterized as laminated structures of carbon, that is, structures consisting of superposed layers or laminae of carbon atoms joined together by weak van der Waals forces. In considering the graphite structure, two sets of axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers (parallel to the planar direction of the crystal structure of the graphite) or the directions perpendicular to the "c" direction.

As noted above, the bonding forces holding the parallel layers of carbon atoms together are only weak van der Waals forces. Graphites can be treated so that the spacing between the superposed carbon layers or laminae can be appreciably opened up so as to provide a marked expansion in the direction perpendicular to the layers, that is, in the "c" direction and thus form an expanded graphite structure (also referred to as exfoliated or intumesced graphite) in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated articles and flexible graphite sheets of expanded graphite, e.g. webs, papers, strips, tapes, or the like. The formation of graphite particles which have been expanded to have a final thickness or "c" dimension which is as much as about 80 or more times the original "c" direction dimension into integrated articles and flexible sheets by compression, without the use of any binding material, is believed to be possible due to the excellent mechanical interlocking, or cohesion, which is achieved between the voluminously expanded graphite particles.

Generally, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is at least about 80 times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. Controlling the degree of compression can vary the density and thickness of the sheet material. The density of the sheet material can be within the range of from about 0.1 grams per cubic centimeter to about 1.5 grams per cubic centimeter.

Once the flexible graphite sheet is prepared, it can be formed into a powder by, for instance, air classifier milling, jet milling, ball milling, hammer milling or by other processes which would be familiar to the artisan. Alternatively, the particles of expanded graphite, prior to being formed into a flexible graphite sheet, can be formed into a powder for use in the present invention.

DETAILED DESCRIPTION OF THE INVENTION

As discussed above, the present invention involves increasing the conductivity of a material or article, or increasing the conductivity of a surface of an article. The process centers on either coating on a surface of an article, such as a component part of a motor vehicle, like an automobile, or on the surface (or walls) of one or more of the through holes of a printed circuit board, a composition comprising particles of expanded graphite. After coating with the graphite composition the article can be treated, such as by electrostatic painting of the component part or electrolytically depositing copper on the printed circuit board through holes. In another embodiment, the process involves incorporating into a material or article, such as a motor vehicle component part, a grease or oil, an adhesive or a rubber composition, particles of expanded graphite in order to increase the conductivity of the material or article, after which the material or article can be further treated, such as by electrostatic painting.

Graphite starting materials suitable for use in the present invention include highly graphitic carbonaceous materials capable of intercalating acids such as sulfuric acid, nitric acid, etc. These highly graphitic carbonaceous materials have a degree of graphitization above about 0.80 and most preferably about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include synthetic graphites and natural graphites from various sources, as well as other carbonaceous materials such as petroleum cokes heat treated at temperatures above 2500° C., carbons prepared by chemical vapor deposition or pyrolysis of hydrocarbons and the like.

The graphite starting materials used in the present invention may contain non-carbon components so long as the crystal structure of the starting materials maintains the required degree of graphitization. Generally, any carbon-containing material, the crystal structure of which possesses the required degree of graphitization, is suitable for use with the present invention. Such graphite preferably has an ash content of less than six weight percent.

As noted, graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are referred to as "particles of intercalated graphite." Upon exposure to high temperature, the particles of intercalated graphite expand in dimension as much as about 80 or more times their original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent such as nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes and the flakes are water-washed. The quantity of intercalation solution retained on the flakes after draining may range from about 20 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713, the disclosure of which is also herein incorporated by reference. Upon exposure to high temperature, of at least about 300° C. and especially 700° C. to 1000° C. and higher, the particles of intercalated graphite expand as much as about 80 to 1000 or more times their original volume in an accordion-like fashion in the c-direction (in the direction perpendicular to the crystalline planes of the constituent graphite particles) to form expanded graphite particles or worms. The resulting worms may be compressed together into flexible sheets.

As noted, the worms themselves, or sheets formed from the worms, can be milled into powder. The milling can be by methods familiar to the skilled artisan, such as air classifier milling, ball milling or hammer milling, with jet milling being most preferred. For use in a composition suitable as a conductive coating on an article, such as a motor vehicle component part or the walls of printed circuit board through holes, the expanded graphite worms should be milled down to a particle size whose average diameter is no greater than about 150 microns, preferably no greater than about 100 microns. Although the finer the particle size, the easier it is to apply a composition containing the powder to a surface, there is no need for particles having an average diameter smaller than 10 microns to provide a suitable coating composition. When the expanded graphite powder is to be incorporated into a material or an article, such as a grease or oil, or a molded plastic article usable as a motor vehicle component part, the average particle size of the powder should be no greater than about 125 microns, and preferably no greater than about 75 microns. Again, there is no compelling reason for the particles to have average diameters below about 10 microns, although using such particle sizes is not disadvantageous from a performance point of view.

As noted above, the powdered expanded graphite can be incorporated into a composition that can then be coated on an article for which increased conductivity is desired. For instance, the composition can be coated on a motor vehicle component part to dissipate static electricity or to facilitate electrostatic painting of the part, or the composition can be coated on the walls of one or more of the through holes of printed circuit boards to provide sufficient conductivity to support the electrolytic deposition of copper. The composition should also include a carrier material for the powdered expanded graphite material. Such a carrier should be sufficient to maintain a dispersion of the graphite in the composition, and should be capable of applying the powdered expanded graphite material to the substrate so as to provide a relatively consistent and uniform coating of expanded graphite powder on the substrate.

Suitable carriers for inclusion in the inventive composition include resins, such as acrylic resins, water dispersible polymers, such as sodium carboxymethylcellulose in a water based carrier, adhesive compositions, paint compositions, and related carrier materials. Other ingredients, such as surfactants and dispersants can also be included. The expanded graphite powder should be included in the composition in an amount calculated to provide increased conductivity to the substrate once the composition is applied to the substrate. Although this will depend on factors selected by the artisan, such as coating level, etc., the expanded graphite powder should advantageously be included in the composition in an amount of from about 5% by weight to about 15% by weight. Although higher amounts of graphite are feasible, undesirable effects, such as loss of composition strength after coating, brittleness, etc. may be observed.

When the expanded graphite powder is included in the material or substrate itself, i.e., included in the molding composition or otherwise incorporated into the material from which the substrate is formed, the powder should be incorporated at a level of about 1% to about 20% by weight, to avoid negatively affecting the mechanical properties of the finished substrate or material. More preferably, the graphite powder is included in the substrate or material composition in an amount of about 3% to about 15% by weight, to provide a significant increase in electrical and/or thermal conductivity.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A process for providing increased electrical conductivity to a substrate that comprises a plastic material, the process comprising coating the substrate with a composition which comprises particles of expanded graphite, wherein the substrate comprises a component part for a motor vehicle.

2. The process of claim 1 which further comprises forming the particles of expanded graphite into a powder prior to coating the composition on the substrate.

3. The process of claim 2 wherein the composition further comprises a carrier for the powdered particle expanded graphite, the carrier comprising a material capable of forming an adherent coating on the substrate.

4. The process of claim 3 wherein the carrier is selected from the group consisting of paints, resins, adhesives or mixtures thereof.

5. The process of claim 1, wherein said particles have an average diameter of no greater than about 150 microns.

6. The process of claim 1, wherein said particles of expanded graphite are present in the composition in an amount of from about 5% by weight to about 15% by weight.

7. The process of claim 1 which further comprises thereafter electrostatically painting the coated substrate.

8. A process for providing increased conductivity to a material that comprises a plastic material, the process comprising incorporating expanded graphite into the material, the material being a component part for a motor vehicle.

9. The process of claim 8 which further comprises forming the expanded graphite into a powder prior to incorporating the expanded graphite into the material.

10. The process of claim 8 which further comprises thereafter electrostatically painting the material.

11. An electrically conductive material which comprises a plastic material-comprising substrate having thereon a coating comprising particles of expanded graphite, wherein the substrate comprises a component part for a motor vehicle.

12. The material of claim 11 wherein the particles of expanded graphite are in the form of a powder.

13. The material of claim 12 which further comprises a carrier for the powdered particles of expanded graphite, the carrier comprising a material forming an adherent coating on the substrate.

14. The material of claim 13 wherein the carrier is selected from the group consisting of paints, resins, adhesives or mixtures thereof.

15. The material of claim 11, wherein said particles have an average diameter of no greater than about 150 microns.

16. The material of claim 11 wherein said particles of expanded graphite are present in the coating in an amount of from about 5% by weight to about 15% by weight.

17. A conductive material, comprising a plastic material having particles of expanded graphite incorporated therein, wherein the material comprises a component part for a motor vehicle.

18. The material of claim 17 wherein the particles of expanded graphite are in the form of a powder.

19. The material of claim 17, wherein said particles have an average diameter of no greater than about 150 microns.

20. A process for providing increased electrical conductivity to a substrate, comprising coating the substrate with a composition which comprises particles of expanded graphite, wherein the substrate comprises a printed circuit board which comprises through holes therethrough.

21. The process of claim 20 which further comprises forming the particles of expanded graphite into a powder prior to coating the composition on the substrate.

22. The process of claim 21 wherein the composition further comprises a carrier for the powdered particle expanded graphite, the carrier comprising a material capable of forming an adherent coating on the substrate.

23. The process of claim 22 wherein the carrier is selected from the group consisting of paints, resins, adhesives or mixtures thereof.

24. The process of claim 20 wherein the composition is coated on the surfaces of at least one of the through holes of the printed circuit board.

25. The process of claim 24 which further comprises electrolytically depositing copper on the surfaces of at least one of the through holes of the printed circuit board after coating of the composition on the surface of surfaces of the at least one through hole.

26. The process of claim 20, wherein said particles have an average diameter of no greater than about 150 microns.

27. The process of claim 20, wherein said particles of expanded graphite are present in the composition in an amount of from about 5% by weight to about 15% by weight.

28. An electrically conductive material which comprises a substrate having thereon a coating comprising particles of expanded graphite which comprises a printed circuit board having through holes, the composition coated on the surface of at least one of the through holes.

29. The material of claim 28 wherein the particles of expanded graphite are in the form of a powder.

30. The material of claim 29 which further comprises a carrier for the powdered particles of expandable graphite, the carrier comprising a material forming an adherent coating on the substrate.

31. The material of claim 28, wherein said particles have an average diameter of no greater than about 150 microns.

32. The material of claim 28, wherein said particles of expanded graphite are present in the coating in an amount of from about 5% by weight to about 15% by weight.

* * * * *